Dec. 1, 1942.   L. B. WHITE ET AL   2,303,805
APPARATUS FOR MAKING SHEET GLASS
Original Filed March 30, 1938   2 Sheets-Sheet 2
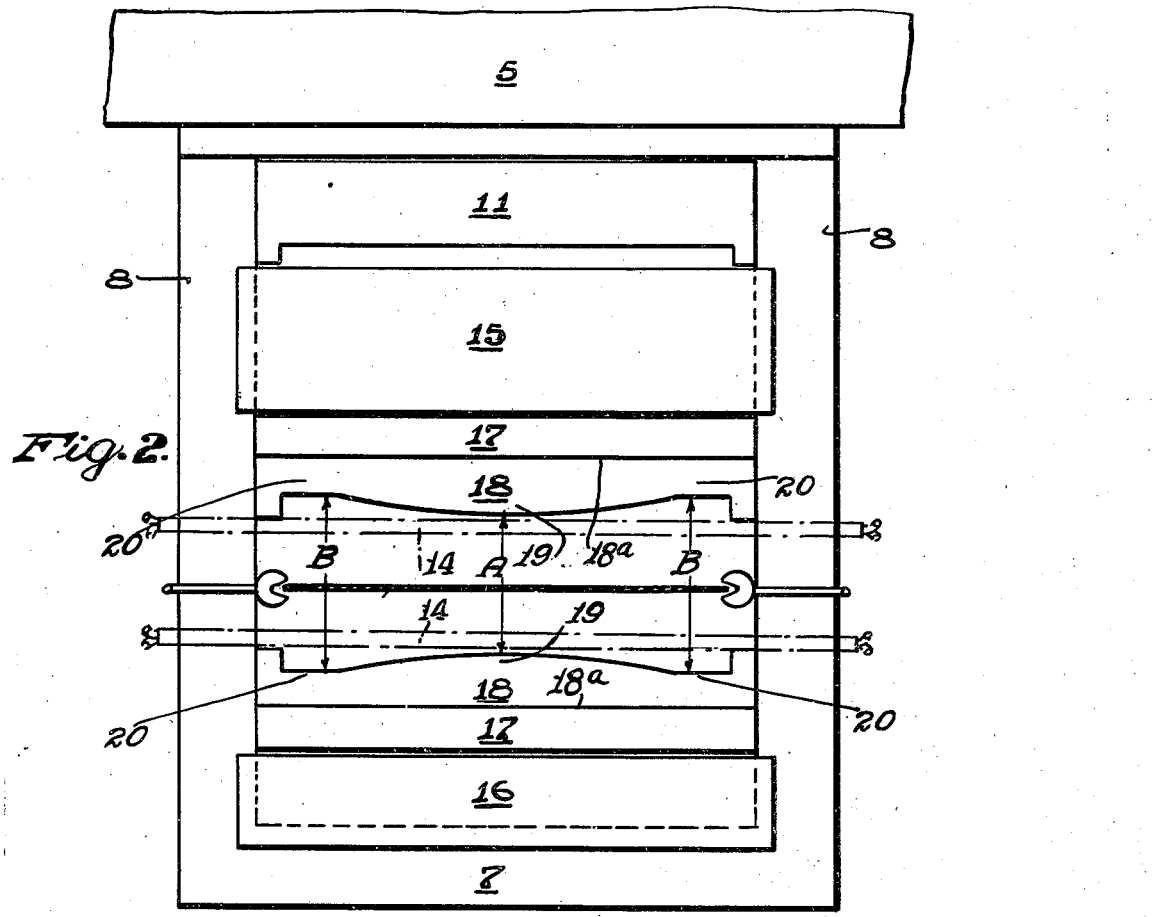
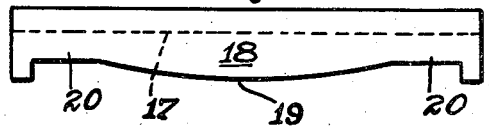
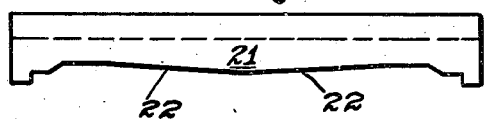
INVENTORS
LURTY B. WHITE AND
FOREST S. THARP
BY
Olen E. Bee
ATTORNEY Patented Dec. 1, 1942

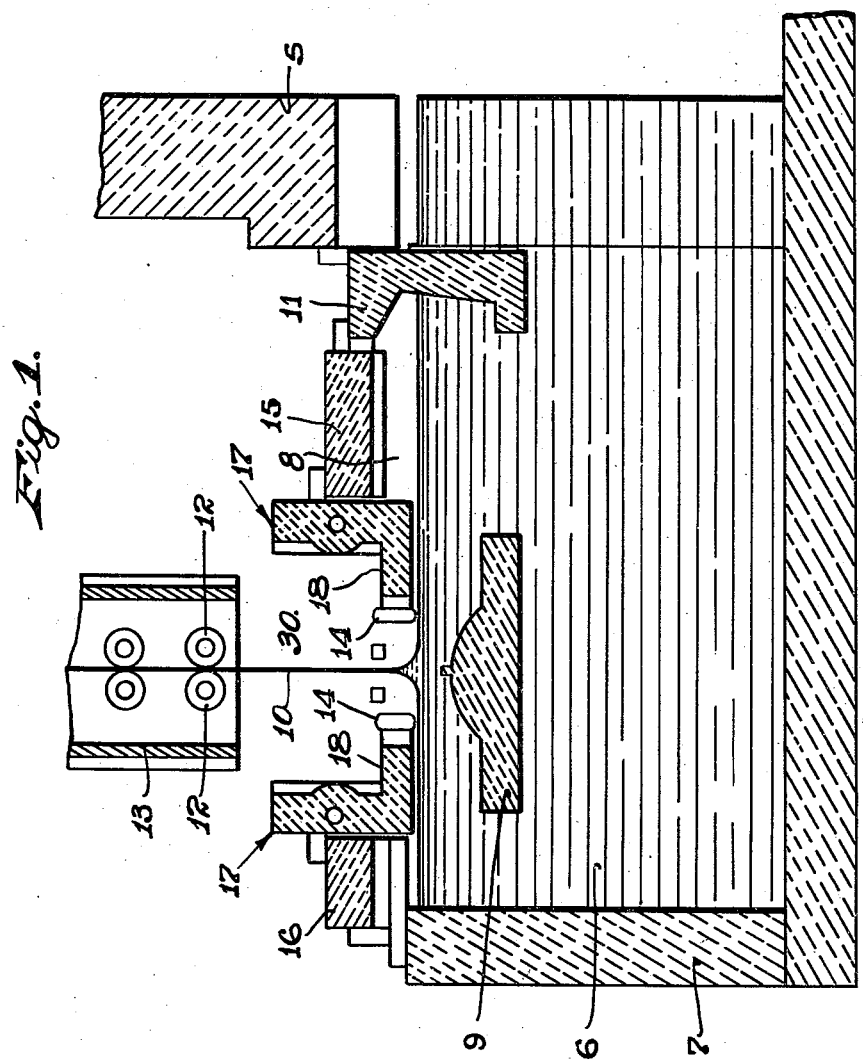

2,303,805

UNITED STATES PATENT OFFICE 2,303,805

APPARATUS FOR MAKING SHEET GLASS

Lurty B. White and Forest S. Tharp, Clarksburg, W. Va., assignors to Pittsburgh Plate Glass Company, a corporation of Pennsylvania Refiled for abandoned application Serial No. 198,868, March 30, 1938. This application March 24, 1939, Serial No. 263,925

10 Claims. (Cl. 49—17)

The invention relates to apparatus for making sheet glass by a process in which the glass sheet is drawn vertically from a drawing tank or forehearth. The invention described herein includes that disclosed in our abandoned application, Serial No. 198,868, filed March 30, 1938, and the specification and drawings herein presented are substituted for those of said abandoned application. The tank is provided with a top with an opening extending transversely thereof, through which the sheet is drawn. Cooling boxes lie in the opening on each side of the sheet adjacent the base of the sheet for chilling the glass, in order to permit the drawing of a sheet of a given thickness at a higher rate of speed than would be possible without the coolers. The chilling of the glass is due, in part to the coolers and in part to the exposure of the surface of the bath to the atmosphere at each side of the line of draw. In drawing a sheet under these conditions, it has been found that the sheet is somewhat thicker at its central portion than at its sides, and to avoid this difficulty, it has been customary to reduce the chilling effect of coolers at the central portion of the sheet by hanging transite shades or pads on the central portions of the coolers, so that they lie between this portion of the coolers and the glass sheets.

We have found that the difficulty can be overcome in another way, and one which will permit of a higher drawing speed. Briefly stated, this consists in modifying the shape of the drawing opening, so that the cooling effect of the atmosphere at the side portions of the bath is increased. The edges of the opening are defined by the horizontal flanges of the L blocks at each side of the line of draw, and in accordance with the present improvement, these flanges, instead of having straight edges parallel to the line of draw, taper or incline away from the line of draw from the center of the tank toward the edges thereof. This gives a sheet of uniform thickness and an increase in drawing speed of approximately 25 per cent, since no shielding of the central portions of the coolers is required.

Certain embodiments of the invention are illustrated in the accompanying drawings, wherein:

Figure 1 is a fragmentary vertical section through a drawing tank or forehearth. Fig. 2 is a diagrammatic plan view of the drawing tank. Fig. 3 is a bottom plan of one of the L blocks. Fig. 4 is a bottom plan of another form of L block.

Referring to the drawings, 5 is the end wall of the melting tank, from which glass is supplied to the forehearth 6; 7 is the end wall of the forehearth; and 8, 8 are the side walls thereof (Fig. 2). A drawbar 9 extends transversely of the forehearth from one side to the other to facilitate the drawing of the glass sheet 10, and a cut off and skin bar 11 also extends transversely of the forehearth at its entrance end. The glass sheet 10 is drawn continuously from the bath by means of the pairs of rolls 12 in the leer casing 13, and these rolls, together with the draw bar 9, define the plane of drawing in which the sheet glass 10 is upwardly drawn. A pair of cooling boxes 14, 14 through which water is circulated extend transversely of the forehearth above the bath and assist in chilling the surface thereof, as is common in the art. These coolers are shown diagrammatically in Figs. 1 and 2.

The top or cover of the forehearth is made up of the upper side of the bar 11, the plates 15 and 16 and the L blocks 17, 17, the space between the horizontal flanges 18, 18 of the L blocks constituting the drawing opening. The upper portions of the L-blocks are in the form of upright flanges 18a and, therefore, each L-block is somewhat similar in shape to an angle iron. This portion of the bath is chilled, due to radiation and to cooling contact with the atmosphere. As heretofore pointed out, the glass sheet being drawn would run thicker at its central portion than at its edges, if the edges of the horizontal flanges 18, 18 of the L blocks were parallel to the sheet and to each other, and if the drawing opening were of uniform width from one side of the forehearth to the other. The L blocks, the lower structure of the leer 13 and the adjacent cooperating parts of the apparatus structure form a so-called drawing chamber 30 through which the glass sheet passes upwardly during the first stages of the drawing operation and the vertical sheet glass during such operation is disposed across this chamber between the vertical planes defining the side walls 8. With the exception of the shape of the L blocks 17, the arrangement of the elements of the apparatus structure defining the space from the molten bath up to the leer casing 13 is more or less conventional and is similar to that shown in Fig. 1 of patent to Koupal et al. No. 1,598,729 of September 7, 1926.

This difficulty, which was a disadvantage in previously known constructions, is overcome, as will be seen by reference to Figs. 2 and 3, by bowing the flanges 18, 18 toward the line of draw, as indicated at 19, so that the width A of the drawing opening, opposite the center of the sheet, is less than the dimensions B, B at the points 20, 20 near the sides of the forehearth. In other words, the lower surface of each L block (Figs. 1 and 3) is disposed at a predetermined distance above and substantially parallel to the upper surface of the bath of molten glass. Since the intermediate portion of the lower surface of each L block has a greater width, heat absorption in the lower side of the L block from the molten glass is greater and more concentrated at this intermediate portion than the heat absorption toward the narrower end portions of the L block. As a result, the glass is chilled more, due to radiation, opposite the side portions of the sheet than at the central portion, and the tendency of the glass to draw thicker at the center of the sheet, than at the sides, is avoided. The requirement of placing shielding pads on the cooling boxes 14, 14 opposite the center of the sheet, is therefore avoided, and it is possible to draw a sheet of glass of uniform thickness from edge to edge at a higher rate of speed, then has heretofore been possible. In practice, the distance A is about 3 inches less than the distances B, B, but this may vary within certain limits, depending on the width of the forehearth and other conditions.

Fig. 4 illustrates another form of construction, in which the manner of bowing the edge of the horizontal flange 21 of the L block is changed in that the lines 22, 22 are substantially straight instead of being curved and these lines extend closer to the ends of the block than is the case with the curved line of Fig. 3. While, as illustrated and described, the horizontal flanges of the L blocks define the drawing opening, the invention is not limited to the use of L blocks, as any other form of cover members for the bath might be employed at the sides of the drawing opening for defining such opening.

We claim:

1. In an apparatus including a tank containing a molten glass bath and also including a drawing chamber through which sheet glass is adapted to be drawn upwardly in a predetermined plane, means for drawing the sheet glass upwardly from the glass bath with its plane of drawing disposed transversely of the tank, said drawing chamber including a refractory block extending above the bath transversely of the tank on each side of the plane of drawing, said block having an inner edge facing the plane of drawing and bowed centrally and laterally toward said plane of drawing, the inner block-edge and plane defining between them a space increasing in width in opposite directions from its central portion toward opposite sides of the tank.

2. In an apparatus including a tank containing a molten glass bath and also including a drawing chamber through which sheet glass is adapted to be drawn upwardly in a predetermined plane, means for drawing sheet glass upwardly from the glass bath with its plane of drawing disposed transversely of the tank, said drawing chamber including L-blocks extending transversely of the tank on opposite sides of the plane of drawing, said blocks including horizontally disposed flanges defining between them an opening of varying width through which the sheet glass is to be drawn, the minimum width of said opening being at the central portion of the tank and said opening increasing in width from its central portion toward opposite sides of the tank.

3. In an apparatus including a tank containing a molten glass bath and including a refractory structure defining a drawing chamber extending across the tank above the bath, said refractory structure being shaped to provide a sheet-glass-receiving opening extending across the chamber above the bath and leading upwardly into said chamber, and means for drawing sheet glass upwardly from the glass bath through said opening, portions of the refractory structure defining the opposed sides of the opening being inclined relative to one another outwardly from central portions thereof, the lines of inclination of said sides being in substantially horizontal planes whereby said opening increases in width from its central portion toward opposite extremities thereof.

4. In an apparatus including a tank containing a molten glass bath and also including means for drawing sheet glass upwardly along a predetermined plane from the bath, and refractory members disposed across the tank on opposite sides of the plane of drawing and having surfaces facing each other from opposite sides of said plane in proximity to the bath, said facing surfaces on opposite sides of said plane diverging from one another from central portions thereof toward opposite sides of the tank, the lines of divergence being in substantially horizontal planes.

5. In an apparatus including a glass drawing tank containing a bath of molten glass, means for drawing sheet glass upwardly along a predetermined plane from the glass bath, a draw bar defining with said means the plane along which the sheet glass is adapted to be drawn, refractory members supported adjacent opposite sides of said plane and having opposed surfaces which define an opening above the bath through which the sheet glass is drawn, each of said surfaces including a central portion projecting laterally toward said plane, said surfaces on opposite sides of said plane diverging from one another whereby the distance laterally from the plane to each of said surfaces increases from the central portion of the plane outwardly in horizontal directions.

6. In an apparatus including a tank with a molten glass bath therein, means for drawing sheet glass upwardly from the glass bath along a predetermined plane, refractory members including opposed edges disposed on opposite sides of the plane of drawing, said members being disposed immediately above said bath in facing relation thereto and defining along their opposed edges a drawing opening through which sheet glass is drawn, the lower bath-facing surface of each of said members decreasing in width from its central portion in opposite directions whereby said drawing opening is narrower at the central portion thereof and increases in width toward its opposite extremities.

7. In an apparatus including a tank with a molten glass bath therein, means for drawing sheet glass upwardly from the glass bath along a predetermined plane, spaced refractory members disposed on opposite sides of the plane of drawing and defining between them a drawing opening through which the sheet glass is drawn, each refractory member having a lower substantially horizontal surface disposed in proximity to the upper surface of the bath in substantially parallel relation thereto, said lower surface having its greater width along its central portion and decreasing in width toward its opposite extremities.

8. In an apparatus including a tank with opposite side walls and containing a molten glass bath, means defining a drawing plane upwardly from the bath along which the sheet glass is adapted to be drawn, refractory members disposed on opposite sides of the plane of drawing and extending substantially from one side wall to the other, each refractory member having an upright flange substantially parallel to said plane and having a horizontal flange directed laterally toward said plane, said horizontal flange having a lower plane surface facing the molten bath in opposed parallel relation thereto and decreasing in width from its central portion toward said side walls of the tank.

9. In an apparatus including a tank with a molten glass bath contained therein, means for drawing a glass sheet upwardly from said bath, an L-block arranged in proximity to the sheet, said L-block having a horizontal lower flange projecting laterally toward the sheet and terminating in an edge that faces said sheet, the sheet-facing edge of the flange projecting at its central portion toward said sheet glass and increasing in distance from the sheet glass in opposite directions toward opposite extremities of the flange.

10. An L-block for inclusion in a drawing chamber of an apparatus in which glass is adapted to be drawn, said block having end portions adapted to be supported in the apparatus, said block having a rear side to face away from the chamber and a front side to face sheet glass to be drawn, said L-block having a lower horizontal flange, the front edge of said flange having surface portions converging forwardly to form a forwardly projecting portion at the central portion of the flange and providing varying horizontal width of the flange.

LURTY B. WHITE.
FOREST S. THARP.